United States Patent
Lee (10) Patent No.: US 6,411,768 B2
(45) Date of Patent: *Jun. 25, 2002

(54) CIRCUIT FOR REPRODUCING SYNC SIGNAL OF COMPOSITE VIDEO SIGNAL

(75) Inventor: Seung-Taek Lee, Kyungki-do (KR)

(73) Assignee: Samsung Electronics, Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,338

(22) Filed: May 29, 1998

(30) Foreign Application Priority Data

May 29, 1997 (KR) .......................... 97-21523

(51) Int. Cl.[7] .............................. H04N 9/79; H04N 9/87
(52) U.S. Cl. .............................................. 386/1; 386/44
(58) Field of Search ........................... 386/46, 84, 111, 386/112, 125, 1, 44, 25, 12; 348/665, 565, 159, 552, 806; 345/581; H04N 9/79, 9/87

(56) References Cited

U.S. PATENT DOCUMENTS

| | | | | |
|---|---|---|---|---|
| 4,051,524 A | * | 9/1977 | Baxter | 348/159 |
| 4,771,334 A | * | 9/1988 | Bolger | 348/806 |
| 4,845,564 A | * | 7/1989 | Hakamada et al. | 348/565 |
| 5,220,413 A | * | 6/1993 | Jeong | 348/665 |
| 5,635,995 A | * | 6/1997 | Strolle et al. | 386/1 |
| 5,721,593 A | * | 2/1998 | Suh | 348/565 |
| 5,917,467 A | * | 6/1999 | Yoshimura | 345/112 |

* cited by examiner

Primary Examiner—Huy Nguyen
(74) Attorney, Agent, or Firm—Robert E. Bushnell, Esq.

(57) ABSTRACT

A sync signal reproducing circuit for a composite video signal, includes: a channel selector for receiving a first composite video signal and a second composite video signal output from a composite video signal input stage, and also receiving a composite video signal selection signal output from a microcomputer, to thereby selectively output the first and second composite video signals; a D-COM filter for receiving the composite video signal selected by the channel selector, and separately outputting its chrominance signal and luminance signal; and a chroma circuit for receiving the chrominance signal and luminance signal of the composite video signal output from the D-COM filter, and thus reproducing the chrominance signal and separating horizontal and vertical sync signals from the luminance signal. The reproducing circuit stably separates the horizontal and vertical sync signals from the luminance of a composite video signal, and the separated sync signals enable the composite video signal and the VGA video signal to be discriminated.

30 Claims, 7 Drawing Sheets

Fig. 7

CIRCUIT FOR REPRODUCING SYNC SIGNAL OF COMPOSITE VIDEO SIGNAL

CLAIM OF PRIORITY

This application makes reference to, incorporates the same herein, and claims all benefits accruing under 35 U.S.C. §119 from my applications entitled CIRCUIT FOR REPRODUCING SYNC SIGNAL OF COMPOSITE VIDEO SIGNAL filed in the Korean Industrial Property Office on May 29, 1997 and there duly assigned Serial No. 97-21523 by that Office.

BACKGROUND OF THE INVENTION

1. Field of the Invention

The present invention relates to a display device equipped with a sync signal reproducing circuit for a composite video signal and, more particularly, to a sync signal reproducing circuit incorporated in a display device for reproducing horizontal and vertical sync signals from luminance signals separated from a composite-video signal externally applied in one of a TV broadcasting mode and a super VHS (S-VHS) mode in order to select signal processing of one of a composite video signal and a VGA video signal for a variable visual display on a screen.

2. Discussion of Related Art

As the performance and scale of microprocessors progress, computer systems have become increasingly sophisticated in processing a variety of information data, such as text, sounds, graphics, animation, movie, and so forth. Such computer systems are known as multimedia computers. In order to perform multimedia function, hardware such as high performance video card, sound card, TV/radio card, and modem must be installed in the computers.

Display devices such as a CRT type of monitor, must process separately a VGA video signal received from a video card installed in the computer system and a composite video signal received from a different source (e.g., TV/radio card) in either a TV broadcasting mode or a super VHS (S-VHS) VHS) mode for a visual display on a screen. For this reason, if a composite video signal processing circuit is built into the display device and in order to selectively output a composite video signal and a VGA video signal, a sync signal reproducing circuit is necessarily required to isolate a sync signal from a luminance signal separated from the composite video signal so that the composite video signal and the VGA video signal can be selected for a visual variable display on a screen.

SUMMARY OF THE INVENTION

Accordingly, it is therefore an object of the present invention to provide a sync signal reproducing circuit incorporated in a display device for reproducing a sync signal from a luminance signal separated from a composite video signal.

It is also an object to provide a sync signal reproducing circuit incorporated in a display device of a multimedia computer system for reproducing a sync signal from a luminance signal separated from a composite video signal externally applied from one of a TV broadcasting mode and a super VHS (S-VHS) mode for effective selection of a VGA video signal or the composite video signal for a variable visual display on a screen.

These and other objects of the present invention can be achieved by a sync signal reproducing circuit incorporated in a display device which comprises: a channel selector for receiving a first composite video signal and a second composite video signal output from a composite video signal input stage, and also receiving a composite video signal selection signal output from a microcomputer, to thereby selectively output the first and second composite video signals; a digital computer (D-COM) filter for receiving the composite video signal selected by the channel selector, and separately outputting its chrominance signal and luminance signal; and a chroma circuit for receiving the chrominance signal and luminance signal of the composite video signal output from the D-COM filter, and thus reproducing the chrominance signal and separating horizontal and vertical sync signals from the luminance signal.

In accordance with another aspect of the present invention, a sync signal reproducing circuit for a composite video signal comprises: a channel selector for receiving a first composite video signal and a second composite video signal output from a composite video signal input stage, and also receiving a composite video signal selection signal output from a microcomputer, to thereby selectively output the first and second composite video signals; a D-COM filter for receiving the composite video signal selected by the channel selector, and separately outputting its chrominance signal and luminance signal; a chroma circuit for receiving and reproducing the chrominance signal of the composite video signal output from the D-COM filter; a first multivibrator for receiving the luminance signal of the composite video signal output from a chroma IC section, to thereby output a horizontal sync signal; and a second multivibrator for receiving the luminance signal of the composite video signal output from the chroma circuit, to thereby output a vertical sync signal.

The present invention is more specifically described in the following paragraphs by reference to the drawings attached only by way of example.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE INVENTION

Figure 1:
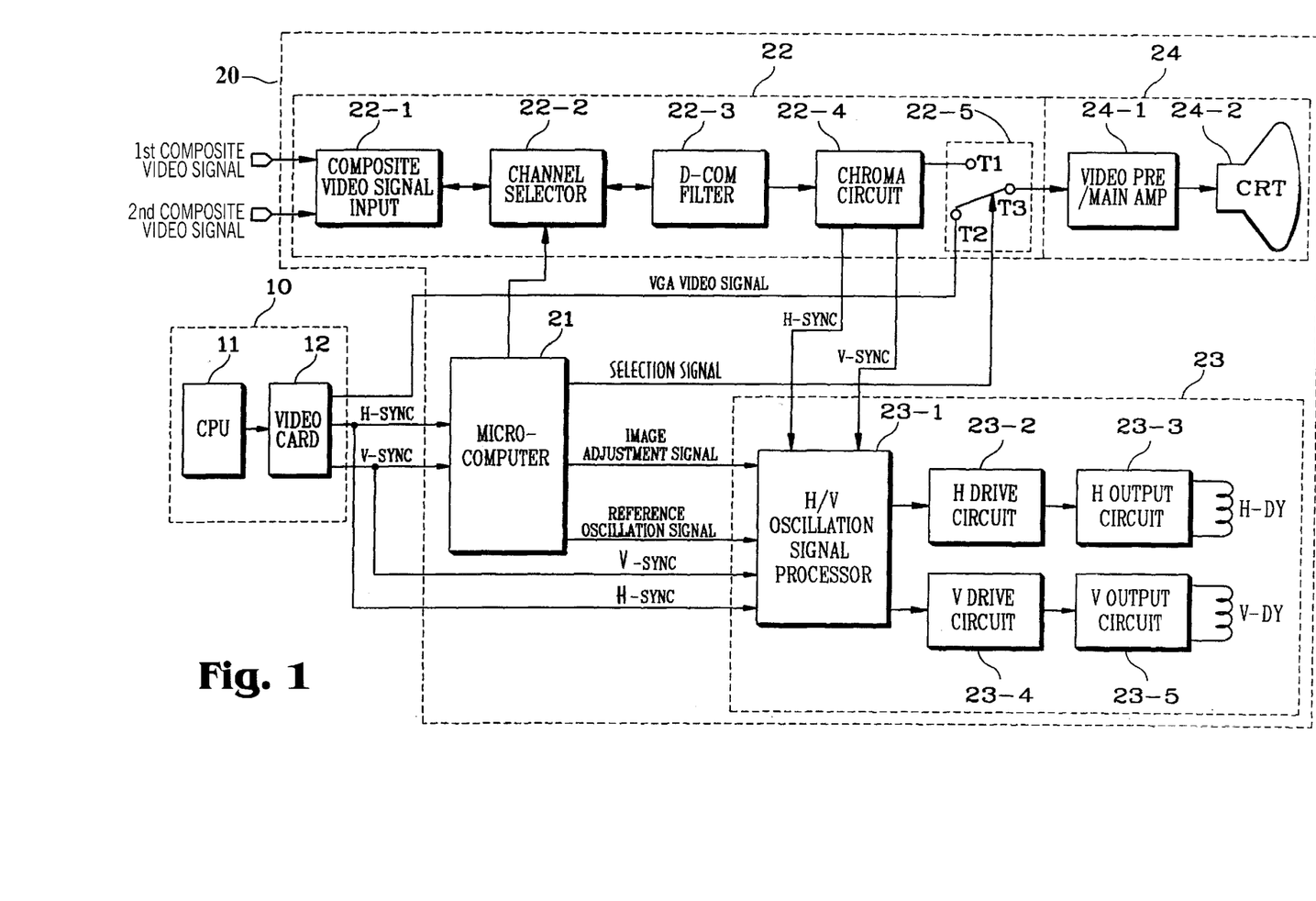
FIG. 1 is a block diagram of a computer system with a display device having a sync signal reproducing circuit incorporated in accordance with a preferred embodiment of the present invention.

Referring now to the drawings FIG. 1, illustrates a computer system with a personal computer (PC) 10 and a display device 20 equipped with a sync signal reproducing circuit according to a preferred embodiment of the present invention. The sync signal reproducing circuit is incorporated to reproduce horizontal and vertical sync signals from luminance signals separated from a composite video signal externally applied in one of a TV broadcasting mode and a super VHS (S-VHS) mode so that a composite video signal and a VGA video signal can be effectively selected for a variable visual display on a screen.

As shown in FIG. 1, the PC 10 comprises a central processing unit (CPU) 11 for implementing software selected by a user to output data information, and a video card 12 for processing the data output from CPU 11, and outputting a VGA video signal and horizontal and vertical sync signals H-SYNC and V-SYNC for synchronizing the VGA video signal output.

The display device 20, which generally processes the VGA video signal and horizontal and vertical sync signals H-SYNC and V-SYNC output from the PC 10, comprises a microcomputer 21, a composite video signal processor 22, a horizontal/vertical deflection circuit section 23, and a video display circuit section 24. The microcomputer 21 receives the horizontal and vertical sync signals H-SYNC and V-SYNC output from video card 12 to generate an image adjustment signal and a reference oscillation signal. In addition, the microcomputer 21 also outputs a composite video signal selection signal and a selection signal for selecting the composite video signal externally applied from a different source, such as a TV/radio card (not shown), or the VGA video signal applied from the video card 12. The composite video signal processor 22 receives and processes the externally applied first and second composite video signals in response to the composite video signal selection signal output from microcomputer 21 to generate a chrominance signal and a luminance signal, and separates and outputs horizontal and vertical sync signals H-SYNC and V-SYNC from the luminance signal. The horizontal/vertical deflection circuit section 23 selectively receives and processes the horizontal and vertical sync signals H-SYNC and V-SYNC output from video card 12 of PC 10, the image adjustment signal and the reference oscillation signal output from microcomputer 21, and the horizontal and vertical sync signals H-SYNC and V-SYNC output from chroma circuit 22-4 of composite video signal processor 22, to thereby generate horizontal and vertical sawtoothwave currents. The video display circuit section 24 selectively receives and amplifies the composite video signal output from composite video signal processor 22 and the VGA video signal output from video card 12, and projects the amplified signals according to the cycle of the horizontal and vertical sawtoothwave currents applied from horizontalvertical deflection circuit section 23 for a variable visual display on a screen.

The composite video signal processor 22 is composed of: a composite video signal input stage 22-1 for receiving and then outputting a first composite video signal, i.e., NTSC composite video signal, and a second composite video signal, i.e., S-VHS composite video signal; a sync signal reproducing circuit comprised of a channel selector 22-2, a digital computer (D-COM) filter 22-3, and a chroma circuit 22-4 for reproducing horizontal and vertical sync signals H-SYNC and V-SYNC SYNC from a luminance signal separated from either the first or second composite video signal; and a switch circuit 22-5 for permitting passage of one of a chrominance signal compensated for and output from chroma circuit 22-4 and a VGA video signal output from video card 12 in response to the selection signal output from microcomputer 21.

The channel selector 22-2 receives the first and second composite video signals output from composite video signal input stage 22-1, and selects one of the first and second composite video signals for output in accordance with the composite video signal selection signal output from microcomputer 21. If the first composite video signal is selected, the D-COM filter 22-3 separates a chrominance signal and a luminance signal from the first composite video signal output from channel selector 22-2. The chroma circuit 22-4 then receives the chrominance signal and luminance signal of the first composite video signal output from D-COM filter 22-3 and the chrominance signal and luminance signal of the second composite video signal passing through channel selector 22-2 in order to separately output the chrominance signals, and horizontal and vertical sync signals H-SYNC and V-SYNC separated from the luminance signals.

The horizontal/vertical deflection circuit section 23 for deflecting the video signals selectively output from the composite video signal processor 22 comprises a horizontal/vertical oscillation signal processor 23-1, a horizontal drive circuit 23-2, a vertical drive circuit 23-4, a horizontal output circuit 23-3 for outputting a horizontal sawtoothwave current to a horizontal deflection yoke H-DY, and a vertical output circuit 23-5 for outputting a vertical sawtoothwave current to a vertical deflection yoke V-DY. The horizontal/vertical oscillation signal processor 23-1 receives the horizontal and vertical sync signals H-SYNC and V-SYNC output from video card 12, the image adjustment signal and the reference oscillation signal output from microcomputer 21, and horizontal and vertical sync signals H-SYNC and V-SYNC separately output from chroma circuit 22-4, to thereby output horizontal and vertical oscillation pulses. The horizontal drive circuit 23-2 processes the horizontal oscillation pulse output from horizontal/vertical oscillation signal processor 23-1, to thereby supply a horizontal drive signal. The horizontal output circuit 23-3 then receives the horizontal drive signal output from horizontal drive circuit 23-2, to thereby generate the horizontal sawtoothwave current to the horizontal deflection yoke H-DY. Likewise, the vertical drive circuit 23-4 processes the vertical oscillation pulse output from horizontal/vertical oscillation signal processor 23-1, to supply a vertical drive signal; and the vertical output circuit 23-5 for receiving the vertical drive signal output from vertical drive circuit 23-4, to thereby generate a vertical sawtoothwave current to vertical deflection yoke V-DY.

The video display circuit section 24 for amplifying the video signal selectively output from composite video signal processor 22, and displaying the amplified video signal according to the cycle of the horizontal and vertical sawtoothwave currents generated from horizontal/vertical deflection circuit section 23, comprises a video pre/main amplifier (AMP) 24-1 for amplifying the composite video signal and VGA video signal selectively output from switch circuit 22-5 of composite video signal processor 22, and a CRT 24-2 for selectively receiving and displaying the composite video signal and VGA video signal output from video pre/main AMP 24-1 according to the horizontal and vertical sawtoothwave currents generated from horizontal and vertical deflection yokes H-DY and V-DY of horizontal/vertical deflection circuit section 23.

Now, the operation of such a display device equipped with a sync signal reproducing circuit will be described in detail with reference to FIG. 1 hereinbelow.

Video card 12 receives data processed in CPU 11 of PC 10 according to the user's selection, and performs video signal processing of the received data. Then, video card 12 generates a VGA video signal and horizontal and vertical sync signals H-SYNC and V-SYNC. The horizontal and vertical sync signals H-SYNC and V-SYNC are sent to microcomputer 21 of display device 20.

Microcomputer 21 receives the horizontal and vertical sync signals H-SYNC and V-SYNC from the video card 12 and discriminates the resolution of the VGA video signal processed and output from video card 12 according to the horizontal and vertical sync signals H-SYNC and V-SYNC In addition, the microcomputer 21 processes image adjustment data stored in the manufacturing procedure, to thereby output an image adjustment signal and a reference oscillation signal.

Here, the VGA video signal output from video card 12 of PC 10 is applied to port "T2" of switch circuit 22-5 of composite video signal processor 20. Switch circuit 22-5 receiving the VGA video signal accepts the selection signal output from microcomputer 21, and connects port "T2" to port "T3" so that the VGA video signal is applied to video pre/main AMP 24-1 of video display circuit section 24.

The video pre/main amplifier AMP 24-1 receiving the VGA video signal output from switch circuit 22-5 amplifies and outputs the amplified VGA video signal to CRT 24-2. Horizontal/vertical deflection circuit section 24 for deflecting the VGA video signal applied to CRT 24-2 accepts horizontal and vertical sync signals H-SYNC and V-SYNC output from video card 12 through horizontal/vertical oscillation signal processor 23-1, and processes the image adjustment signal and the reference oscillation signal output from microcomputer 21, to thereby output the horizontal and vertical oscillation pulses. The horizontal oscillation pulse output from horizontal/vertical oscillation signal processor 23-1 of horizontal/vertical deflection circuit section 24 is sent to horizontal drive circuit 23-2 so that sufficient drive current is supplied to horizontal output circuit 23-2.

The horizontal output circuit 23-3 receiving the drive currents from horizontal drive circuit 23-2 produces the horizontal sawtoothwave current and provides it to horizontal deflection yoke H-DY. Vertical drive circuit 23-4 receives the vertical oscillation pulse output from horizontal/vertical oscillation signal processor 23-1, and supplies sufficient drive current to vertical output circuit 23-5 according to the vertical oscillation pulse applied. Vertical output circuit 23-5 receiving the drive current output from vertical drive circuit 23-4 produces the vertical sawtoothwave current and provides it to vertical deflection yoke V-DY.

CRT 24-2 projects the VGA video signal applied from video pre/main AMP 24-1 according to the cycle of the horizontal and vertical sawtoothwave currents generated and provided to horizontal and vertical deflection yokes H-DY and V-DY, respectively, so that the data processed in CPU 11 of PC 10 are displayed as an image on a screen. Here, in the case where the first and second composite video signals are externally applied from display device 20, they are accepted through composite video signal input stage 22-1. The first composite video signal is typically a composite video signal in NTSC TV broadcasting mode. The second composite video signal is typically a composite video signal generated in an S-VHS mode with chrominance and luminance signals separated.

The composite video signal input stage 22-1 outputs the first and second composite video signals to channel selector 22-2, and selector 22-2 outputs a selected composite video signal according to the composite video selection signal applied from microcomputer 21 to channel selector 22-2. If the composite video selection signal applied from microcomputer 21 is for the selection of the first composite video signal, channel selector 22-2 applies the first composite video signal to D-COM filter 22-3. In D-COM filter 22-3, the first composite video signal is divided into a chrominance signal and a luminance signal because it is a general TV broadcasting signal where the chrominance and luminance signals are superposed on a carrier. The chrominance and luminance signals separated through D-COM filter 22-3 are sent to chroma circuit 22-4. Then, chroma circuit 22-4 compensates for the chrominance signal, and separates horizontal and vertical sync signals H-SYNC and V-SYNC, respectively, from the luminance signal. The chrominance signal output from chroma circuit 22-4 is applied to switch circuit 22-5 via port "T1", and the port switches to port "T3" so that the chrominance signal is applied to video pre/main AM 24-1 of video display circuit section 24.

The video pre/main AMP 24-1 receiving the chrominance signal output from chroma circuit 22-4 according to the switching of switch circuit 22-5 sufficiently amplifies the amplified chrominance signal and applies it to CRT 24-2. The horizontal and vertical sync signals H-SYNC and V-SYNC for determining the cycle of deflecting the first composite video signal applied to CRT 24-2 are separated in chroma circuit 22-4 and sent to horizontal/vertical oscillation signal processor 23-1.

The horizontal/vertical oscillation signal processor 23-1 generates the horizontal and vertical oscillation pulses according to the horizontal and vertical sync signals H-SYNC and V-SYNC applied. The horizontal oscillation pulse produced from horizontal/vertical oscillation signal processor 23-1 is accepted in horizontal drive circuit 23-2. Horizontal drive circuit 23-2 receiving the horizontal oscillation pulse supplies sufficient drive current to horizontal output circuit 23-3 according to the horizontal oscillation pulse applied so that the horizontal sawtoothwave current is generated in horizontal deflection yoke H-DY.

The vertical drive circuit 23-4 receiving the vertical oscillation pulse output from horizontal/vertical oscillation signal processor 23-1 supplies sufficient drive current to horizontal output circuit 23-5 according to the vertical oscillation pulse applied. The vertical output circuit 23-5 receiving the drive current supplied from vertical drive circuit 23-4 produces the vertical sawtoothwave current and provides it to vertical deflection yoke V-DY. The chrominance signal of the first composite video signal, applied to CRT 24-2 according to the horizontal and vertical sawtoothwave currents generated from horizontal and vertical deflection yokes H-DY and V-DY, indicates an image.

When the second composite video signal is applied to display device 20 through composite video signal input stage 22-1 of composite video signal processor 22, i.e., when an S-VHS composite video signal is output from a S-VHS composite video signal reproducer (not shown), the second composite video signal is applied while the chrominance signal and luminance signal are separated for high quality image. The composite video signal input stage 22-1 receiving the second composite video signal outputs the same to channel selector 22-2. The channel selector 22-2 selects the second composite video signal to pass to chroma circuit 22-4 according to the composite video selection signal applied from microcomputer 21.

The chroma circuit 22-4 receiving the chrominance signal and luminance signal of the second composite video signal separates R, G, B signals from the chrominance signal to apply them to port "T1" of switch circuit 22-5. Switch circuit 22-5 receiving the chrominance signal of the second composite video signal via port "T1" switches to port "T3" according to the second composite video signal selection signal applied to microcomputer 21 so that the chrominance signal goes into video pre/main AMP 24-1.

The video pre/main AMP 24-1 receiving the chrominance signal of the second composite video signal amplifies and applies the same to CRT 24-2. Then, CRT 24-2 deflects it by processing the horizontal and vertical sync signals of the luminance signal in horizontal/vertical deflection circuit section 23.

More specifically, horizontal and vertical sync signals H-SYNC and V-SYNC, respectively, are separated from the luminance signal of the second composite video signal applied to chroma circuit 22-4. The horizontal and vertical sync signals H-SYNC and V-SYNE, respectively, are sent to horizontal/vertical oscillation signal processor 23-1 of horizontal/vertical deflection circuit section 23. The horizontal/vertical oscillation signal processor 23-1 generates the horizontal and vertical oscillation pulses according to the horizontal and vertical sync signals H-SYNC and V-SYNC, respectively, separated from the luminance signal of the second composite video signal.

The horizontal oscillation pulse generated from horizontal/vertical oscillation signal processor 23-1 is received in horizontal drive circuit 23-2. The horizontal drive circuit 23-2 supplies sufficient drive current to vertical output circuit 23-3 according to the horizontal pulse applied. The horizontal output circuit 23-3 receiving the drive current output from horizontal drive circuit 23-2 generates a horizontal sawtoothwave current and provides it to horizontal deflection yoke H-DY. The vertical oscillation pulse produced from horizontal/vertical oscillation signal processor 23-1 is accepted in vertical drive circuit 23-4 to produce a drive current for driving vertical output circuit 23-3. The vertical output circuit 23-4 receiving the drive current output from vertical drive circuit 23-2 produces a vertical sawtoothwave current and provides it to vertical deflection yoke V-DY.

According to the cycle of the horizontal and vertical sawtoothwave currents generated from horizontal and vertical deflection yokes H-DY and V-DY, respectively, the chrominance signal of the second video signal applied to CRT 24-2 of video signal processor 24 is deflected so that the second composite video signal and the S-VHS composite video signal are displayed on the screen.

Figure 2:
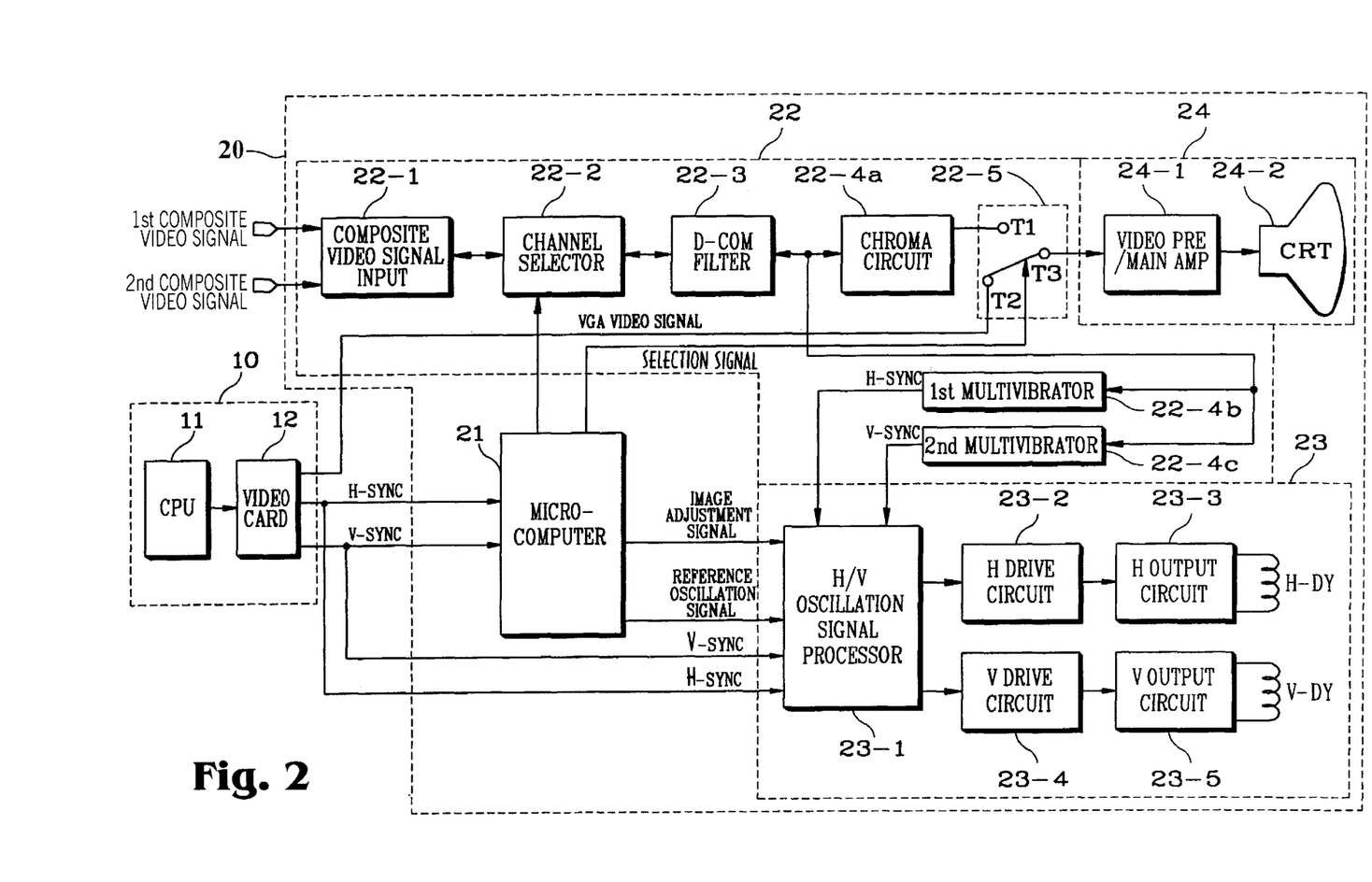
FIG. 2 is a block diagram of a computer system with a display device having a sync signal reproducing circuit incorporated in accordance with another preferred embodiment of the present invention.

FIG. 2 illustrates a computer system with a personal computer (PC) 10 and a display device 20 equipped with a sync signal reproducing circuit according to another preferred embodiment of the present invention. Referring to FIG. 2, the display device 20 which generally processes the VGA video signal output from video card 12 of PC 10 and horizontal and vertical sync signals H-SYNC and V-SYNC, respectively, comprises a microcomputer 21 for receiving horizontal and vertical sync signals H-SYNC and V-SYNC, respectively, output from video card 12 to output an adjustment signal and a reference oscillation signal, and outputting a composite video signal selection signal and another selection signal for selecting the composite video signal or the VGA video signal output from video card 12, a composite video signal processor 22, a horizontal/vertical deflection circuit section 23, and a video circuit section 24.

The composite video signal processor 22 is composed of: a composite video signal input stage 22-1 for receiving and then outputting a first composite video signal, i.e., NTSC composite video signal, and a second composite video signal, i.e., S-VHS composite video signal; a sync signal reproducing circuit comprised of a channel selector 22-2, a digital computer (D-COM) filter 22-3, a chroma (IC) circuit 22-4a, a first multivibrator 22-4b and a second multivibrator 22-4c for reproducing horizontal and vertical sync signals H-SYNC and V-SYNC, respectively, from a luminance signal separated from either the first or second composite video signal; and a switch circuit 22-5 for permitting passage of one of a chrominance signal compensated for and output from chroma circuit 22-4 and a VGA video signal output from video card 12 in response to the selection signal output from microcomputer 21.

Channel selector 22-2 receives the first and second composite video signals output from composite video signal input stage 22-1 and selects the output from one of the first and second composite video signals according to the composite video selection signal output from microcomputer 21. The D-COM filter 22-3 receives the first composite video signal output from channel selector 22-2 and outputs its chrominance signal and luminance signal separated therefrom. The chroma (IC) circuit 22-4a receives the chrominance signal output from D-COM filter 22-3 and outputs the chrominance signal applied. The first multivibrator 22-4b receives the luminance signal of the first composite video signal output from D-COM filter 22-3 and the luminance signal of the second composite video signal passing through channel selector 22-3, to thereby output horizontal sync signal H-SYNC. The second multivibrator 22-4c receives the luminance signal of the first composite video signal output from D-COM filter 22-3 and the luminance signal of the second composite video signal passing through channel selector 22-3, to thereby output vertical sync signal V-SYNC. The switch circuit 22-5 receives the chrominance signal compensated for and output from chroma circuit 22-4a and the VGA video signal output from video card 12, and selects the output from one of the chrominance signal from chroma circuit 22-4a and the VGA video signal from video card 12 according to the selection signal output from microcomputer 21.

The display device 20 further comprises a horizontal/vertical deflection circuit section 23 for selectively receiving and processing horizontal and vertical sync signals H-SYNC and V-SYNC, respectively output from video card 12 of PC 10, the image adjustment signal and the reference oscillation signal output from microcomputer 21, and horizontal and vertical sync signals H-SC and V-SYNC, respectively, output from chroma circuit 22-4 of composite video signal processor 22, to thereby generate horizontal and vertical sawtoothwave currents, and a video display circuit section 24 for selectively receiving and amplifying the composite video signal output from composite video signal processor 22, and the VGA video signal output from video card 12, and projecting it according to the cycle of the horizontal and vertical sawtoothwave currents applied from horizontal/vertical deflection circuit section 23.

Now, the operation of such a display device equipped with a sync signal reproducing circuit according to the second embodiment of the present invention will be described in detail with reference to FIG. 2 hereinbelow.

The VGA video signal generated from PC 10 is accepted in switch circuit 22-5 of composite video signal processor 22 of display device 20. Switch circuit 22-5 receives it via port "T2" and switches to port "T3" according to the VGA video signal selection signal applied from microcomputer 21 so that the VGA video signal is applied to video pre/main AMP 24-1.

The video pre/main AMP 24-1 receiving the VGA video signal amplifies the VGA video signal, and then applies it to CRT 24-2. Here, the VGA video signal is displayed by processing horizontal and vertical sync signals H-SYNC and V-SYNC, respectively output from PC 10 in horizontal/ vertical deflection circuit section 23. In this state, when the first composite video signal, i.e., the NTSC broadcasting signal, is applied externally from display device 20 according to areas, it is accepted in composite video signal input stage 22-1 of composite video signal processor 22. The composite video signal input stage 22-1 applies the first composite video signal to channel selector 22-2.

Channel selector 22-2 sends the first composite video signal to D-COM filter 22-3 applied according to the first composite video signal selection signal fed from microcomputer 21. D-COM filter 22-3 separates the chrominance signal and luminance signal from the first composite video signal. The chrominance signal and luminance signal output from D-COM filter 22-4 are applied to chroma IC 22-4a. The chroma IC 22-4a separates R,G,B from the chrominance signal, and then applies the separated signals to switch circuit 22-5. Switch circuit 22-5 receives them via port "T1."

Switch circuit 22-5 receiving the chrominance signal via port "T1" switches to port "T3" according to the first composite video signal selection signal applied from microcomputer 21 so that the chrominance signal of the first composite video signal is fed to video signal processor 24. Then, video signal processor 24 amplifies it via video pre/main AMP 24-1. The chrominance signal of the first composite video signal amplified via video pre/main AMP 24-1 is applied and displayed in CRT 24-2. Here, the luminance signal separated from chroma IC 24-4 is received in the first and second multivibrators 22-4b and 22-4c, respectively. The first multivibrator 22-4b receives a horizontal period signal from the luminance signal applied.

The first multivibrator 22-4b oscillates according to the horizontal period signal, to thereby produce the horizontal sync signal. The second multivibrator 22-4c receives a vertical period signal contained in the luminance signal separated from the first composite video signal, and oscillates according to the vertical period signal to generate the vertical sync signal V-SYNC.

The horizontal and vertical sync signals H-SYNC and V-SYNC, respectively, generated from the first and second multivibrators 22-4b and 22-4c, respectively, are received in horizontal/vertical oscillation signal processor 23-1 of horizontal/vertical deflection circuit section 23. The horizontal/vertical oscillation signal processor 23-1 generates horizontal and vertical oscillation pulses according to the sync signals applied. The horizontal oscillation pulse generated from horizontal/vertical oscillation signal processor 23-1 is sent to horizontal drive circuit 23-2. The horizontal drive circuit 23-2 generates a drive current according to the horizontal oscillation pulse applied, and then feeds it to horizontal output circuit 23-3.

The horizontal output circuit 23-3 is driven according to the drive current, to thereby produce a horizontal sawtoothwave current for horizontally deflecting the chrominance signal of the first composite video signal, and provides the horizontal sawtoothwave current to horizontal deflection yoke H-DY.

The vertical oscillation pulse generated from horizontal/ vertical oscillation signal processor 23-1 is received in vertical drive circuit 23-4 to supply the drive current to vertical output circuit 23-5. The vertical output circuit 23-5 is driven according to the drive current to generate the vertical sawtoothwave current to vertical deflection yoke V-DY. According to the cycle of the horizontal and vertical sawtoothwave currents generated from horizontal and vertical deflection yokes H-DY and V-DY, respectively, the chrominance signal of the first composite video signal applied to CRT 24-2 is deflected and displayed.

If the second composite video signal, the S-VHS super video signal, is applied to display device 20 from a second composite video signal reproducer (not shown) while the first composite video signal or VGA video signal is selected and displayed, the second composite video signal is input to composite video signal input stage 22-1. Here, the second composite video signal is entered with its chrominance signal and luminance signal separated.

The composite video signal input stage 22-1 sends the second composite video signal to channel selector 22-2. The channel selector 22-2 receiving the second composite video signal also accepts the second composite video signal selection signal from microcomputer 21. Channel selector 22-2 passes the second composite video signal through to chroma IC 22-4a. The chroma IC 22-4a applies the chrominance signal of the second composite video signal to switch circuit 22-5 via port "T1".

The switch circuit 22-5 receiving the chrominance signal via port "T1" switches to port "T3" according to the second composite video signal selection signal output from microcomputer 21 so that the chrominance signal is applied to video pre/main AMP 24-1 of video signal processor 24. The video pre/main AMP 24-1 amplifies the chrominance signal, and applies it to CRT 24-2. Here, sync signals for deflecting the chrominance signal applied to CRT 24-2 are separated from the luminance signal of the second composite video signal which is input with separated chrominance signal and luminance signal. The luminance signal applied to chroma IC 22-4a is fed to the first and second multivibrators 22-4b and 22-4c.

The first multivibrator 22-4b receiving the luminance signal oscillates according to the horizontal period signal contained in the luminance signal, to thereby generate horizontal sync signal H-SYNC. The second multivibrator 22-4c receiving the vertical period signal contained in the luminance signal oscillates according to the vertical period signal, to thereby generate vertical sync signal V-SYNC. Horizontal and vertical sync signals H-SYNC and V-SYNC are received in horizontal/vertical oscillation signal processor 23-1 to produce horizontal and vertical oscillation pulses.

The horizontal and vertical oscillation pulses generated from horizontal/vertical oscillation signal processor 23-1 are applied respectively to horizontal and vertical drive circuits 23-2 and 23-4, respectively. The horizontal and vertical drive circuits 23-2 and 23-4 generate drive currents according to the oscillation pulses applied. The drive currents output from horizontal and vertical drive circuits 23-2 and 23-4, respectively, are received in horizontal and vertical output circuits 23-3 and 23-5 to produce horizontal and vertical sawtoothwave currents provided to horizontal and vertical deflection yokes H-DY and V-DY.

The second composite video signal applied to CRT 24-2 is deflected according to the horizontal and vertical sawtoothwave currents generated according to the cycle of the second composite video signal produced in horizontal and vertical deflection yokes H-DY and V-DY so that the chrominance signal of the second composite video signal is displayed.

Figure 3:
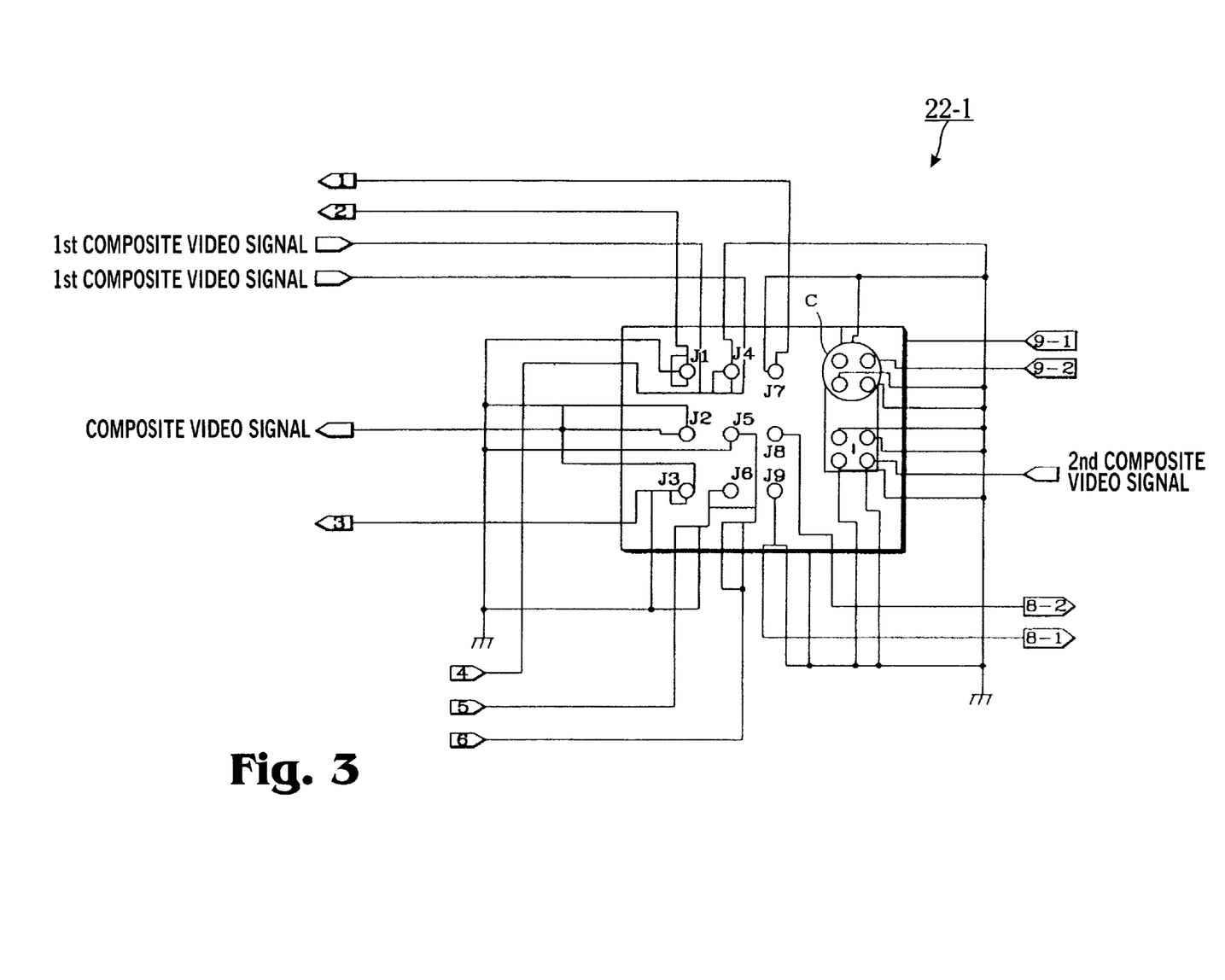
FIG. 3 is a detailed circuit diagram of the composite video signal input stage of the display device as shown in FIG. 2.

A detailed circuit of composite video signal input stage 22 will be described below with reference to FIG. 3. Referring to FIG. 3, composite video signal input stage 22-1 is made up with a plurality of jacks J1–J9 and connector C so that a plurality of first composite video signals or the second composite video signal and the first composite video signals are received. The operation of this configuration will be explained below.

The first composite video signals, the NTSC broadcasting signals, are input via jacks J1–J9 of composite video signal input stage 22-1. Here, the first composite video signals are input after being tuned through TV tuner, cable TV, or S-VHS composite video signal reproducer (not shown).

The second composite video signal, the S-VHS composite video signal, is input from the S-VHS composite video signal reproducer via connector C. Composite video signal input stage 22-1 receiving the first and second composite video signals outputs them according to the selection signal applied. For a brief explanation, signal pads 1 thru 6, 8-1, 8-2, 9-1, 9-2 are devices for processing control signals or audio signals for the first and second composite video signals.

Figure 4:
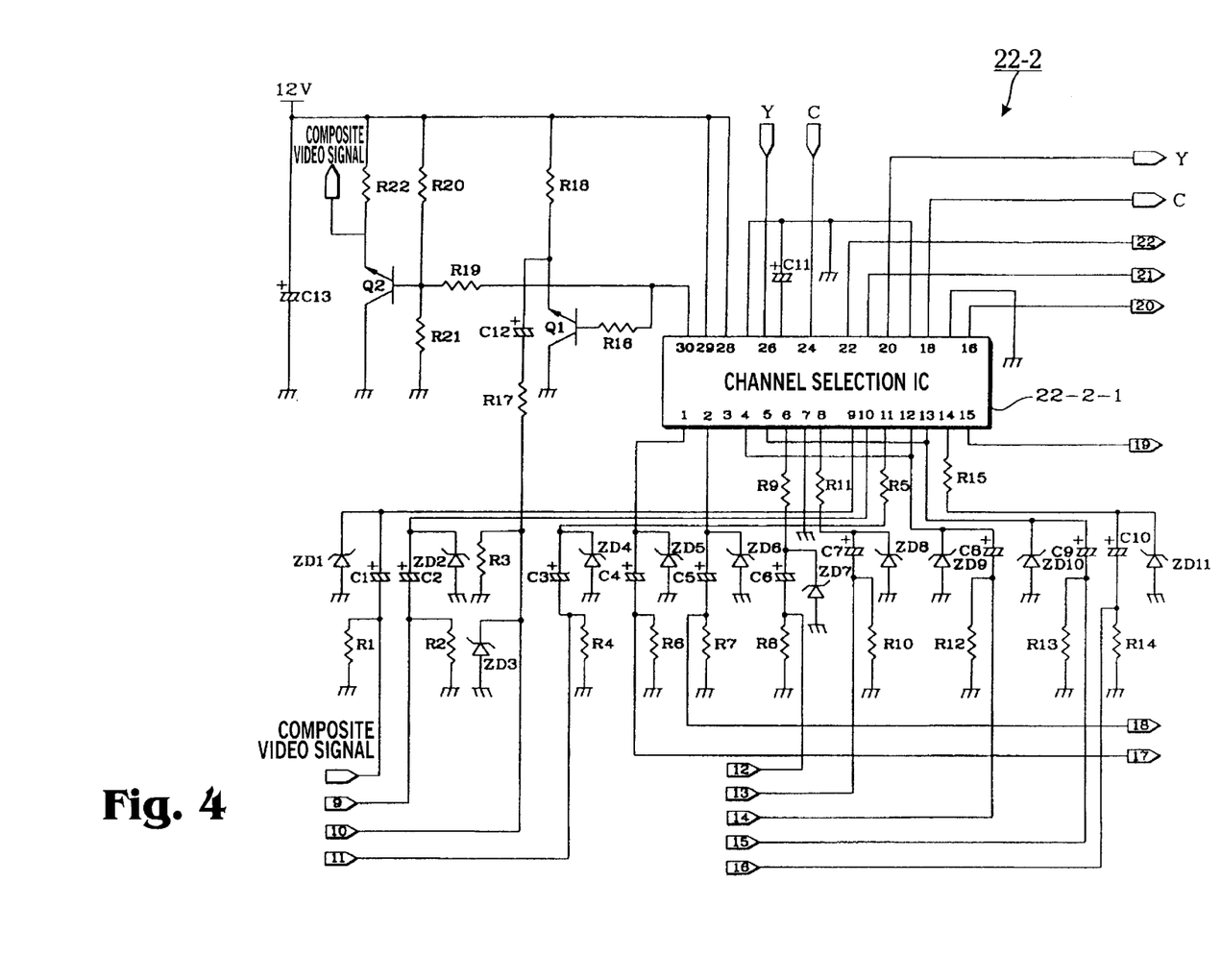
FIG. 4 is a detailed circuit diagram of the channel selector of the display device as shown in FIG. 2.

FIG. 4 provides a detailed circuit diagram of the channel selector 22-2 for processing the composite video signals output from composite video signal input stage 22-1. Referring to FIG. 4, channel selector 22-2 is equipped with a channel selection IC 22-1-1 for receiving the composite video signal selected via composite video signal input stage 22-1 (shown in FIG. 3) and the composite video signal selection signal from microcomputer 21 (in FIG. 3), to thereby apply the first composite video signal to D-COM filter 22-3 (in FIG. 3) or to pass the second composite video signal through a plurality of transistors Q1 and Q2, a plurality of resistors R1–R22, a plurality of capacitors C1–C3, and a plurality of Zener diodes ZD1–ZD11. This configuration's operation will be described below. The first and second composite video signals output from composite video signal input stage 22-1 are transmitted through resistor R1 and capacitor C1, and input to No. 9 pin of channel selection IC 22-2-1 of channel selector 22-2. Here, Zener diode ZD1 maintains a predetermined reference voltage so that the composite video signal is kept at a certain input level when input to channel selection IC 22-2-1. The first and second composite video signals output from import stage 22-1 are fed to channel selection IC 22-2-1 according to the selection of an externally applied composite video signal selection signs. Channel selection IC 22-2-1 selectively outputs the first and second composite video signals according to the composite video signal selection signal output from microcomputer 21.

For instance, if the selection signal for the first composite video signal is applied to channel selection IC 22-2-1 from microcomputer 21, channel selection IC 22-2-1 receives the first composite video signal input via composite video signal input stage 22-1 (in FIG. 4), and then outputs it via No. 30 pin. The first composite video signal is superposed with a DC voltage (12V) induced by resistor R19 and distributed through resistor R20 and resistor R21 so that the first composite video signal's level is compensated for and applied to the base of transistor Q2.

Transistor Q2 receiving the first composite video signal compensates for it, and outputs the compensated signal via its emitter. Here, the first composite video signal is output stably so that its gain does not change through transistor Q2. If the second composite video signal selection signal is applied to channel selection IC 22-2-1 from microcomputer 21, channel selection IC 22-2-1 outputs the second composite video signal according to the selection signal. Because the second composite video signal is input with the chrominance signal C and luminance signal Y separated, channel selection IC 22-2-1 passes the second composite video signal through so that chrominance signal C and luminance signal Y are output via No. 18 pin, respectively, and No. 20 pin.

The signal pads 9-21 are used for the input of the first and second composite video signal selection signals output from microcomputer 21, or for various control signals and audio signals for the first and second composite video signals. The transistor Q1, the resistors, the capacitor, and the Zener diodes are used to transmit the control signals and audio signals, or to remove noise.

Figure 5:
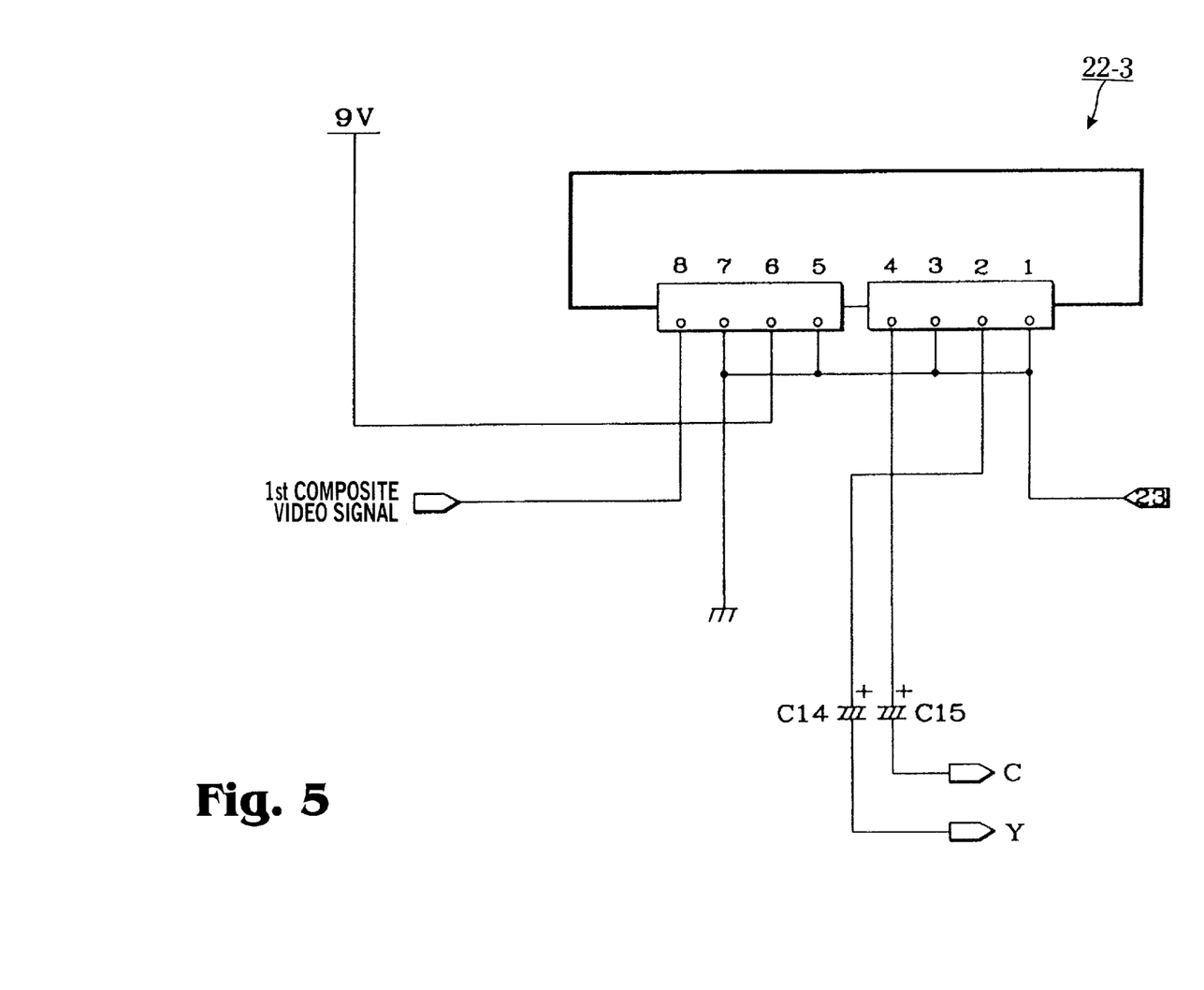
FIG. 5 is a detailed circuit diagram of the D-COM filter of the display device as shown in FIG. 2.

From now on, there will be explained in detail the D-COM filter 22-3 for separating chrominance signal C and luminance signal Y from the first composite video signal, the NTSC broadcasting signal, output via No. 30 pin of channel selection IC 22-2-1 of channel selector 22-2.

Referring to FIG. 5, D-COM filter 22-3 is driven with DC voltage (9V) applied via No. 6 pin. D-COM filter 22-3 running with the DC voltage (9V) receives the first composite video signal output from channel selection IC 22-2-1 (as shown in FIG. 5) through No. 8 pin. Then, D-COM filter 22-3 separates chrominance signal C and luminance signal Y from the first composite video signal. Here, the D-COM filter 22-3 accepts various control signals for separating the chrominance and luminance signals from the first composite video signal from signal pad 22 via No. 1 pin, No. 3 pin, and No. 5 pin.

According to the control signals applied, D-COM filter 22-3 outputs the first composite video signal input from channel selection IC 22-2-1 via No. 2 pin and No. 4 pin. From No. 2 pin of D-COM filter 22-3, luminance signal Y is output via capacitor C14, and from No. 4 pin, chrominance signal C is output via capacitor C15. The chrominance signal C and luminance signal Y of the first composite video signal output from D-COM filter 22-3 are fed to channel selection IC 22-2-1 via No. 24 pin and No. 26 pin, respectively.

Channel selection IC 22-2-1, receiving chrominance signal C and luminance signal Y of the first composite video signal, outputs them via No. 19 pin and No. 20 pin, respectively. From now on, chroma IC 22-4a (as shown in FIG. 6) will be explained in detail.

Figure 6:
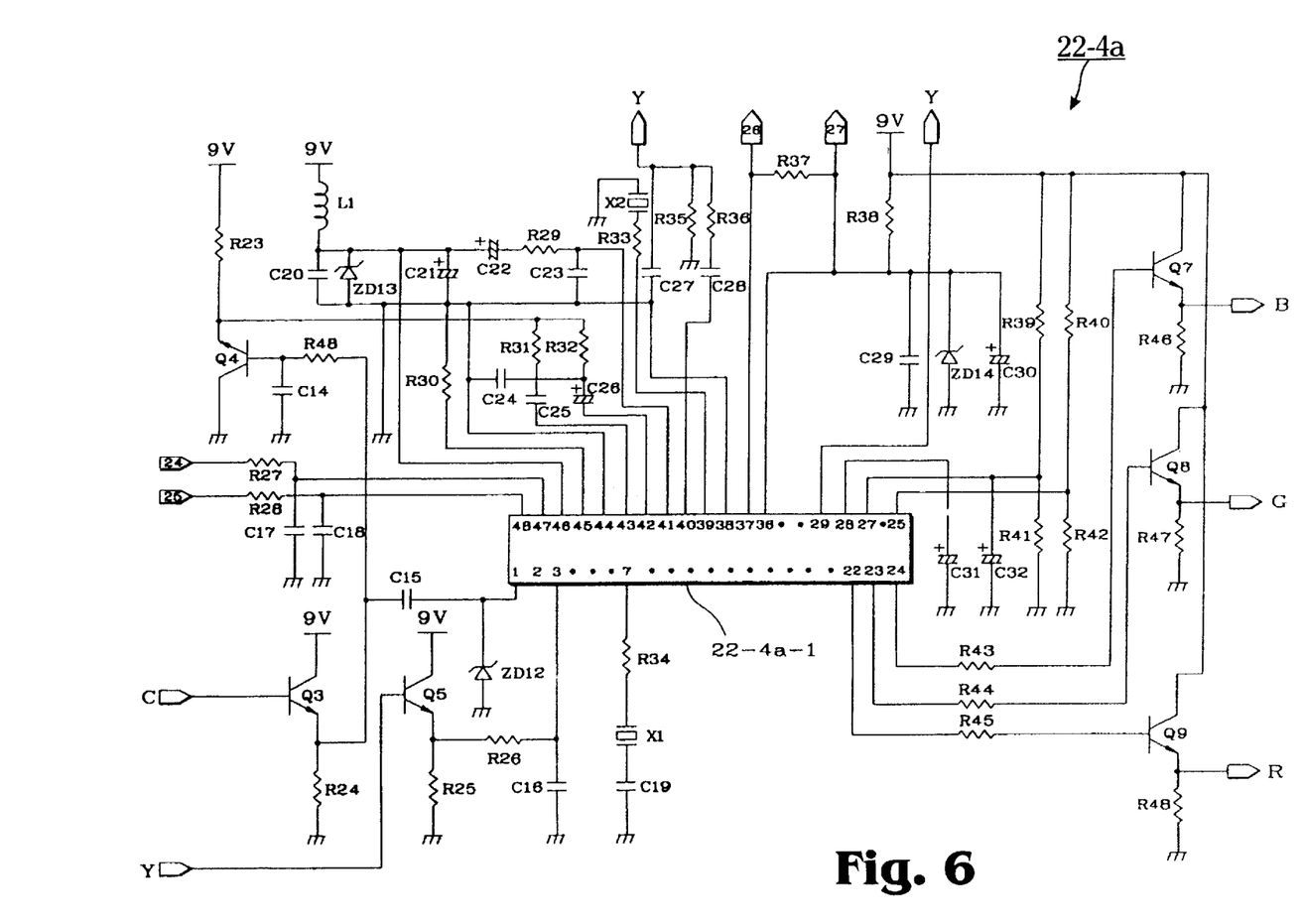
FIG. 6 is a detailed circuit diagram of the chroma circuit of the display device as shown in FIG. 2.

Referring to FIG. 6, chroma IC 22-4a comprises: chroma IC 22-4a-1 for receiving chrominance signal C and luminance signal Y of the first and second composite video signals output from D-COM filter 22-3, and separating R,G,B from chrominance signal C and outputting luminance signal Y; a plurality of transistors Q3–Q9; a plurality of resistors R23–R48; a plurality of capacitors C14–C32; a plurality of Zener diodes ZD13 and ZD14; a plurality of oscillators X1 and X2; and a coil L1. The operation of this arrangement will be explained below with priority given to the chrominance and luminance signals of the first and second composite video signals.

First of all, the chrominance signal C of the first and second composite video signals output from D-COM filter 22-3 (in FIG. 5) is applied to the base of transistor Q3. Transistor Q3 receiving chrominance signal C via the base is driven with the DC voltage (9V) so that chrominance signal C is stably output via the emitter without change of its gain. The chrominance signal C output from transistor Q3 is input to No. 1 pin of chroma IC 22-4a-1 via capacitor C 15. Then, chroma IC 22-4a-1 separates R,G,B from the chrominance-signal C of the first or second composite video signal, and outputs the separated R,G,B via No. 22 pin, No. 23 pin, and No. 24 pin.

Here, oscillators X1 and X2 generate oscillation pulses for synchronizing the composite video signal in chroma IC 22-4a-1. The oscillation pulse generated from oscillator X1 is input to No. 39 pin of chroma IC 22-4a-1. The oscillation pulse from oscillator X2 is compensated for by capacitor C19, induced by resistor R34, and then input to No. 7 pin of chroma IC 22-4a-1. The oscillation pulses respectively input to No. 7 pin and No. 39 pin of chroma IC 22-4a-1 serve to synchronize R,G,B separated from the first or second composite video signal.

The R signal of the R,G,B output from chroma IC 22-4a-1 is induced by resistor R45 via No. 24 pin, and then applied to the base of transistor Q9. Transistor Q9, receiving the R signal via the base, stably outputs its gain. The G and B signals of the composite video signal are output respectively from No. 23 pin and No. 24 pin, induced, respectively by resistors R43 and R44, and then applied, respectively to the bases of transistors Q8 and Q9. Transistors Q8 and Q9 output the G and B signals so that their gains do not change.

The R,G,B of the composite video signal output from transistors Q7, Q8, Q9 are applied to switch circuit 22-5 (in FIG. 3), which switches according to the selection of composite video signal to apply them to video signal processor 24 (in FIG. 3) for their amplification. The R,G,B of composite video signal, amplified in video signal processor 24 (in FIG. 3), are applied to CRT 24-2 (in FIG. 3) and displayed as an image.

Transistor Q5, receiving luminance signal Y of the first or second composite video signal stably, outputs it without change of gain. The luminance signal Y output to the emitter of transistor Q5 is induced via resistor R26 and capacitor C16, and then input to No. 3 pin of chroma IC 22-4a-1.

Chroma IC 22-4a-1, receiving luminance signal Y via No. 3 pin, outputs it via No. 29 pin and No. 38 pin with the gain stably kept. The luminance signal output via No. 29 pin and No. 38 pin of chroma IC 22-4a-1 is output to the first and second multivibrators 22-4b and 22-4c.

The plurality of resistors, capacitors, Zener diodes, and coil of FIG. 6, which are not explained in detail, are used for compensation for the control signals and audio signals, for removal of noise, or for input/output signal matching. The DC voltage (9V) supplied via coil L1 is used as chroma IC 22-4a1's driving voltage. The first and second multivibrators 22-4b and 22-4c, respectively, receiving luminance signal Y output from chroma IC 22-4a-1 will be explained below referring to the attached drawing.

Figure 7:
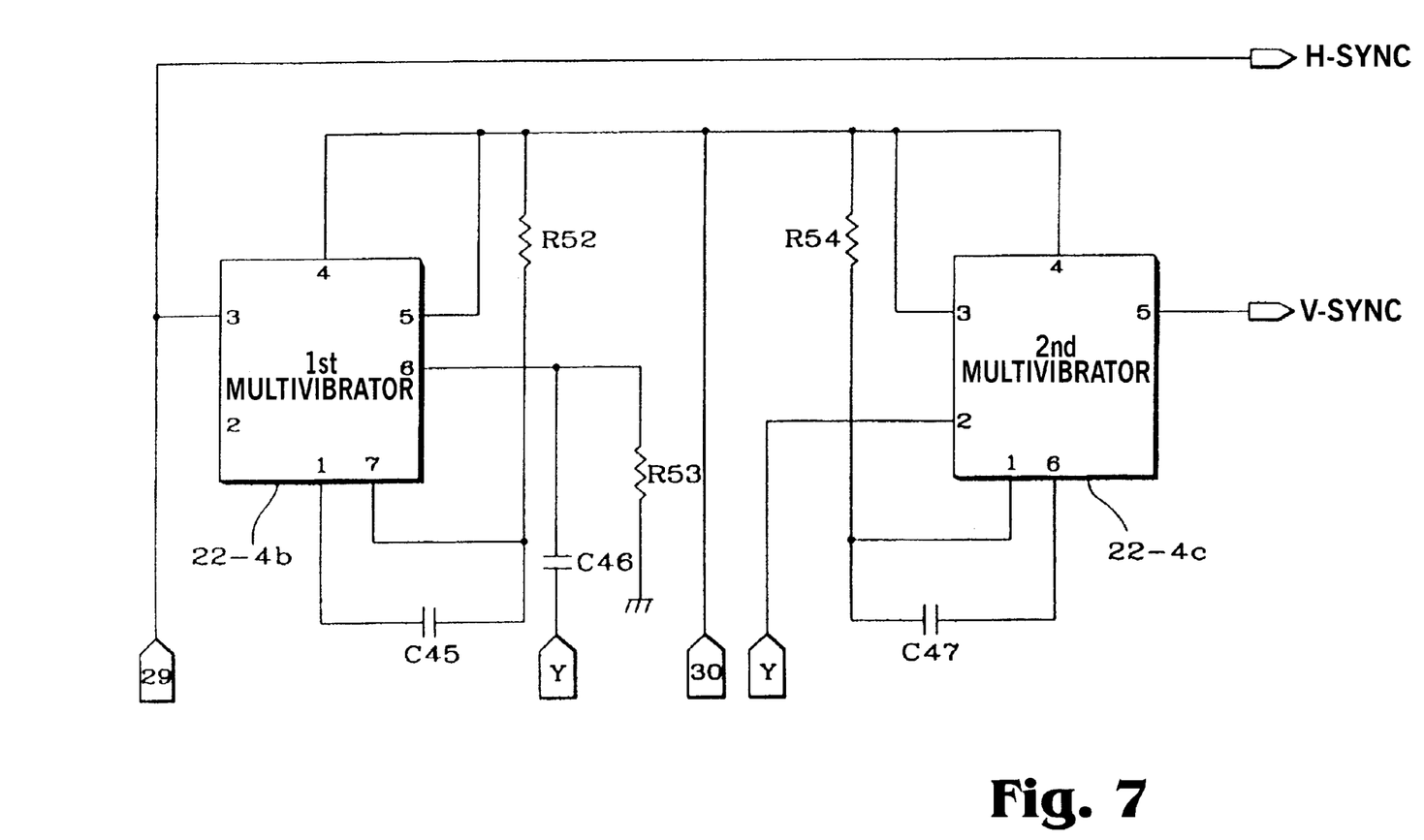
FIG. 7 is a detailed circuit diagram of the first and second multivibrators of the display device as shown in FIG. 2.

Turning to HG. 7, the luminance signal Y output from chroma IC 22-4a is input to the first and second multivibrators 22-4b and 22-4c, respectively. The first multivibrator receives the horizontal period signal from luminance signal Y via No. 6 pin and capacitor 46. Then, the first multivibrator 22-4b charges or discharges with the time constant of resistor R52 and capacitor C45, connected via No. 1 pin and No. 7 pin, to generate horizontal sync signal H-SYNC, which is output via No. 3 pin.

The second multivibrator 22-4c receives the vertical period signal from luminance signal Y output from chroma IC 22-4a-1 via No. 2 pin. Then, the second multivibrator 22-4c charges or discharges with the time constant of resistor R4 and capacitor C47, connected to No. 1 pin and No. 7 pin, to generate vertical sync signal V-SYNC, which is output via No. 5 pin. The horizontal and vertical sync signals H-SYNC and V-SYNC, respectively, output via the first and second multivibrators 22-4b and 22-4c, respectively, are applied to horizontal/vertical deflection circuit section 23 so that the first and second composite video signals are deflected for a visual display on a screen.

By separating the horizontal and vertical sync signals from the luminance signal of the first and second composite video signals, the NTSC broadcasting signal and the S-VHS broadcasting signal, the first and second composite video signals can be discriminated from the VGA video signal using the separated horizontal and vertical sync signals.

As described above, with the sync signal reproducing circuit for composite video signal constructed according to the principles of the present invention, the horizontal and vertical sync signals are stably separated from the luminance signal of the composite video signal. In addition, using the separated horizontal and vertical sync signals, the composite video signal and VGA video signal can be selected in a display device.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A sync signal reproducing circuit for a composite video signal in a display device, comprising:
    a channel selector coupled to receive both a first composite video signal and a second composite video signal from a composite video signal input stage, and for selectively outputting one of the first composite video signal and the second composite video signal as a selected composite video signal in accordance with a composite video selection signal;
    a digital filter connected to said channel selector for separating a chrominance signal and a luminance signal from the selected composite video signal outputted from the channel selector; and
    a chroma circuit connected to said digital filter for reproducing and outputting the chrominance signal, and for separating horizontal and vertical sync signals from the luminance signal;
    wherein said display device includes a microcomputer which generates the composite video selection signal, and said channel selector is connected to said microcomputer for receiving the composite video selection signal therefrom.

2. The circuit of claim 1, further comprising a switch circuit for switching between the chrominance signal outputted from the chroma citcuit and a VGA video signal output from a video card in accordance with a selection signal output from a microcomputer.

3. The circuit of claim 1, said first composite video signal corresponding to an NTSC TV broadcast signal, and said second composite video signal corresponding to a super-VHS composite video signal.

4. The circuit of claim 2, said first composite video signal corresponding to an NTSC TV broadcast signal, and said second composite video signal corresponding to a super-VHS composite video signal.

5. The circuit of claim 1, said channel selector further comprising an input circuit for receiving the first composite video signal, said input circuit including a Zener diode for maintaining the first composite video signal at a given input level.

6. The circuit of claim 5, said channel selector further comprising an output circuit including a transistor having a base, and a resistor connected to the base for inducing a direct current voltage into the composite video signal prior to application to said base.

7. The circuit of claim 1, said channel selector further comprising an output circuit including a transistor having a base, and a resistor connected between the base for inducing a direct current voltage into the composite video signal prior to application to said base.

8. A sync signal reproducing circuit for a composite video signal, comprising:

a channel selector coupled to receive a first composite video signal and a second composite video signal from a composite video signal input stage, and for selectively outputting one of the first composite video signal and the second composite video signal as a selected composite video signal in accordance with a composite video selection signal;

a digital filter connected to said channel selector for separating a chrominance signal and a luminance signal from the selected composite video signal outputted from the channel selector;

a chroma circuit connected to said digital filter for reproducing and outputting the chrominance signal separated from the selected composite video signal in the digital filter;

a first multivibrator connected to said digital filter for outputting a horizontal sync signal from the luminance signal of the selected composite video signal; and a second multivibrator connected to said digital filter for outputting a vertical sync signal from the luminance signal of the selected composite video signal.

9. The circuit of claim 8, said channel selector comprising a channel selection IC for receiving the first and second composite video signals from the composite video signal input stage, for receiving the composite video selection signal from a microcomputer, and for feeding the first composite video signal to the digital filter and for passing the second composite video signal to the chroma circuit.

10. The circuit of claim 9, said channel selector further comprising an input circuit for receiving the first composite video signal, said input circuit including a Zener diode for maintaining the first composite video signal at a given input level.

11. The circuit of claim 10, said channel selector further comprising an output circuit including a transistor having a base, and a resistor connected between the base and the channel selection IC for inducing a direct current voltage into the composite video signal prior to application to said base.

12. The circuit of claim 9, said channel selector further comprising an output circuit including a transistor having a base, and a resistor connected between the base and the channel selection IC for inducing a direct current voltage into the composite video signal prior to application to said base.

13. The circuit of claim 8, said chroma circuit comprising an integrated circuit for receiving the chrominance signal and the luminance signal of the selected composite video signal, for separating R,G,B signals from the chrominance signal, and for outputting the luminance signal.

14. The circuit of claim 13, said chroma circuit comprising an integrated circuit for receiving the chrominance signal and the luminance signal, for separating R, G and B signals from the chrominance signal, and for outputting the luminance signal.

15. The circuit of claim 14, said chroma circuit further comprising an input transistor having a base, a collector and an emitter, said base receiving the chrominance signal, said chrominance signal being driven by a direct current voltage applied to the collector of said transistor, said chrominance signal being outputted via the emitter to said integrated circuit.

16. The circuit of claim 15, said chroma circuit further comprising at least one oscillator for generating oscillation pulses for synchronizing the composite video signal in the integrated circuit.

17. The circuit of claim 13, said chroma circuit further comprising at least one oscillator for generating oscillation pulses for synchronizing the composite video signal in the integrated circuit.

18. The circuit of claim 13, said chroma circuit further comprising a plurality of output transistors, one for each of the R, G and B signals, for outputting the R, G and B signals with stable gain.

19. The circuit of claim 8, further comprising a switch circuit for switching between the chrominance signal outputted from the chroma circuit and a VGA video signal output from a video card in accordance with a selection signal output from a microcomputer.

20. The circuit of claim 19, said first composite video signal corresponding to an NTSC TV broadcast signal, and said second composite video signal corresponding to a super-VHS composite video signal.

21. The circuit of claim 8, said first composite video signal corresponding to an NTSC TV broadcast signal, and said second composite video signal corresponding to a super-VHS composite video signal.

22. A sync signal reproducing circuit for a composite video signal in a display device, comprising:

a channel selector coupled to receive a first composite video signal and a second composite video signal from a composite video signal input stage, and for selectively outputting one of the first composite video signal and the second composite video signal as a selected composite video signal in accordance with a composite video selection signal;

a digital filter connected to said channel selector for separating a chrominance signal and a luminance signal from the selected composite video signal outputted from the channel selector; and chroma circuit connected to said digital filter for reproducing and outputting the chrominance signal, and for separating horizontal and vertical sync signals from the luminance signal;

said channel selector comprising a channel selection IC for receiving the first and second composite video signals from the composite video signal input stage, for receiving the composite video selection signal from a microcomputer, and for feeding the first composite video signal to the digital filter and for passing the second composite video signal to the chroma circuit.

23. The circuit of claim 22, said channel selector further comprising an input circuit for receiving the first composite video signal, said input circuit including a Zener diode for maintaining the first composite video signal at a given input level.

24. The circuit of claim 23, said channel selector further comprising an output circuit including a transistor having a base, and a resistor connected between the base and the channel selection IC for inducing a direct current voltage into the composite video signal prior to application to said base.

25. The circuit of claim 22, said channel selector further comprising an output circuit including a transistor having a base, and a resistor connected between the base and the channel selection IC for inducing a direct current voltage into the composite video signal prior to application to said base.

26. A sync signal reproducing circuit for a composite video signal in a display device, comprising:
   a channel selector coupled to receive a first composite video signal and a second composite video signal from a composite video signal input stage, and for selectively outputting one of the first composite video signal and the second composite video signal as a selected composite video signal in accordance with a composite video selection signal;
   a digital filter connected to said channel selector for separating a chrominance signal and a luminance signal from the selected composite video signal outputted from the channel selector; and
   a chroma circuit connected to said digital filter for reproducing and outputting the chrominance signal, and for separating horizontal and vertical sync signals from the luminance signal;
   said chroma circuit comprising an integrated circuit for receiving the chrominance signal and the luminance signal, for separating R, G and B signals from the chrominance signal, and for outputting the luminance signal.

27. The circuit of claim 26, said chroma circuit further comprising an input transistor having a base, a collector and an emitter, said base receiving the chrominance signal, said chrominance signal being driven by a direct current voltage applied to the collector of said transistor, said chrominance signal being outputted via the emitter to said integrated circuit.

28. The circuit of claim 27, said chroma circuit further comprising at least one oscillator for generating oscillation pulses for synchronizing the composite video signal in the integrated circuit.

29. The circuit of claim 26, said chroma circuit further comprising at least one oscillator for generating oscillation pulses for synchronizing the composite video signal in the integrated circuit.

30. The circuit of claim 26, said chroma circuit further comprising a plurality of output transistors, one for each of the R, G and B signals, for outputting the R, G and B signals with stable gain.

* * * * *